(12) United States Patent
Song et al.

(10) Patent No.: US 12,551,585 B2
(45) Date of Patent: Feb. 17, 2026

(54) SANITIZING APPLIANCE

(71) Applicant: Hamilton Beach Brands, Inc., Glen Allen, VA (US)

(72) Inventors: Brandon Sung-Hwan Song, Glen Allen, VA (US); Michael Garman, Stafford, VA (US); Julie Bray, Richmond, VA (US); Paul M Blankenship, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 440 days.

(21) Appl. No.: 18/178,072

(22) Filed: Mar. 3, 2023

(65) Prior Publication Data

US 2024/0293590 A1   Sep. 5, 2024

(51) Int. Cl.
*A61L 2/07* (2006.01)
*A61L 2/26* (2006.01)
*A61L 103/50* (2026.01)

(52) U.S. Cl.
CPC ............... *A61L 2/07* (2013.01); *A61L 2/26* (2013.01); *A61L 2103/50* (2026.01); *A61L 2202/11* (2013.01); *A61L 2202/121* (2013.01); *A61L 2202/122* (2013.01); *A61L 2202/14* (2013.01)

(58) Field of Classification Search
CPC .......... A61L 2/07; A61L 2/26; A61L 2202/11; A61L 2202/121; A61L 2202/122; A61L 2202/14; A61L 2202/26; A61L 2/04; A61L 2/18; A61L 2/24
See application file for complete search history.

(56) References Cited

U.S. PATENT DOCUMENTS

| | | | |
|---|---|---|---|
| 4,332,214 A | * 6/1982 | Cunningham | A01K 1/0353 119/482 |
| 11,596,263 B1 | * 3/2023 | Siann | A61L 2/07 |
| 2003/0051387 A1 | * 3/2003 | Rodgers | A01M 31/008 43/1 |
| 2004/0258559 A1 | * 12/2004 | Paskal | A46B 17/06 422/26 |
| 2005/0169666 A1 | * 8/2005 | Porchia | A61L 9/14 399/111 |
| 2006/0263237 A1 | * 11/2006 | Holley | A61L 2/07 422/26 |
| 2007/0140895 A1 | * 6/2007 | Paskal | A61L 2/04 422/26 |

FOREIGN PATENT DOCUMENTS

| | | | | |
|---|---|---|---|---|
| CN | 1972659 A | * | 5/2007 | |
| CN | 110545776 A | * | 12/2019 | ............ A61G 11/00 |
| JP | 2002291814 A | * | 10/2002 | |
| KR | 20070018002 A | * | 2/2007 | ............ F21S 6/001 |
| KR | 101625020 B1 | * | 6/2016 | ............ A47L 17/04 |

* cited by examiner

*Primary Examiner* — Regina M Yoo
(74) *Attorney, Agent, or Firm* — Alexander D. Raring

(57) ABSTRACT

A sanitizing appliance includes: a base having a reservoir and a heating unit positioned to heat the reservoir; an extendable rack mounted to the base, the rack moveable between raised and lowered positions; and a cover comprising lower and upper cover sections. In a first enlarged mode, the lower cover section is interposed between the upper cover section and the base to form a first, larger sanitizing chamber, and in a second compact mode, the upper section and the base form a second, smaller sanitizing chamber.

12 Claims, 10 Drawing Sheets

SANITIZING APPLIANCE

FIELD

The present invention is directed generally to countertop appliances, and more particularly to countertop sanitizing appliances.

BACKGROUND

Portable sanitizing appliances for cleaning various household items are known. As one example, some sanitizers employ ultraviolet (UV) light to sanitize items such as cutlery, particularly when such cutlery is used to slice raw meats. Once such appliance is discussed in U.S. Pat. No. 10,874,756, which describes an appliance having a housing in which the item to be sanitizing is placed and a source of UV radiation (e.g., a UV lamp) that is directed to the item. The item is exposed to the UV radiation for a time and at an intensity sufficient to kill any germs present on the item.

In other instances, sanitizing appliances may be configured for sanitizing a specific type of item. As an example, U.S. Pat. No. 8,128,760 is directed to a sanitizer for baby bottles. The sanitizer discussed therein has an interior chamber for housing baby bottles and other related accessories, a perforated floor, a water reservoir below the floor and a heater beneath the reservoir. Activating the heater causes water in the reservoir to convert to steam, which rises through the perforations in the floor to create steam that can clean items positioned in the chamber. The device may be subdivided into two subchambers, each of which may be used to house different items (e.g., the bottom subchamber may house the container portion of the bottles, whereas the top chamber may house nipples for the bottles).

It may be desirable to provide additional configurations for sanitizing household items, particularly items that are prone to becoming soiled.

SUMMARY

As a first aspect, embodiments of the invention are directed to a sanitizing appliance. The sanitizing appliance comprises: a base having a reservoir and a heating unit positioned to heat the reservoir; an extendable rack mounted to the base, the rack moveable between raised and lowered positions; and a cover comprising lower and upper cover sections. In a first enlarged mode, the lower cover section is interposed between the upper cover section and the base to form a first, larger sanitizing chamber, and in a second compact mode, the upper section and the base form a second, smaller sanitizing chamber.

As a second aspect, embodiments of the invention are directed to a sanitizing appliance comprising: a base having a reservoir and a heating unit positioned to heat the reservoir; an extendable rack mounted to the base, the rack moveable between raised and lowered positions; and a cover comprising lower and upper cover sections. In a first enlarged mode, the lower cover section is interposed between the upper cover section and the base to form a first, larger sanitizing chamber, and in a second compact mode, the lower cover section is removed, and the upper section and the base form a second, smaller sanitizing chamber.

As a third aspect, embodiments of the invention are directed to a method of sanitizing items, comprising the steps of:
(a) providing a sanitizing appliance comprising a base having a reservoir, a heating unit positioned to heat the reservoir, an extendable rack mounted to the base, and a cover, the base and cover defining a sanitizing chamber;
(b) depositing sanitizing liquid in the reservoir;
(c) positioning the extendable rack in either a raised position or a lowered position,
(d) positioning items to be sanitized in the sanitizing chamber; and
(e) heating the sanitizing liquid in the reservoir with the heating unit to convert the sanitizing liquid to steam to sanitize the items.

DETAILED DESCRIPTION

Figure 1:
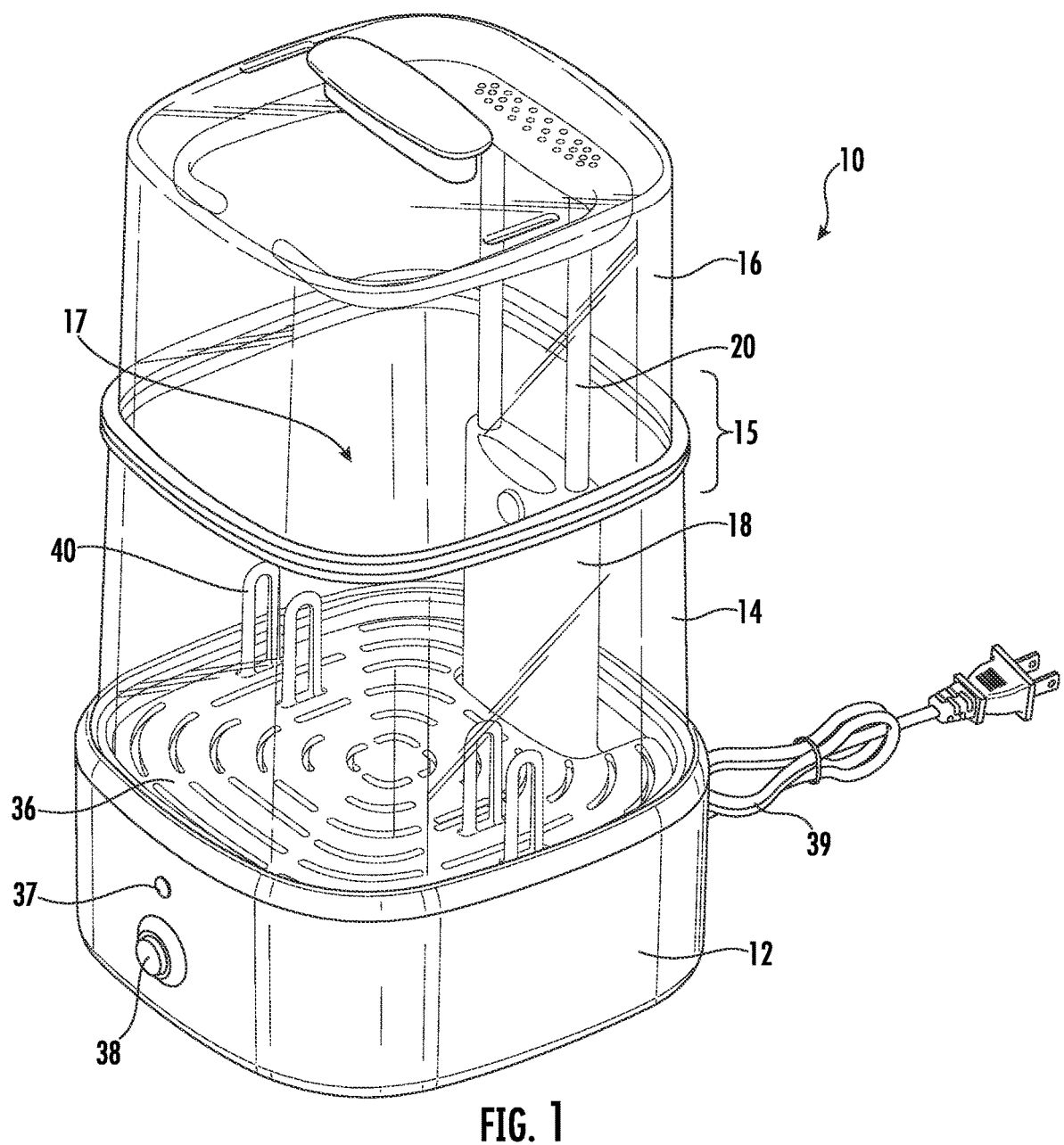
FIG. 1 is a front perspective view of a sanitizing appliance according to embodiments of the invention, with the appliance in its enlarged mode and the rack in its raised position.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Referring now to the drawings, a sanitizing appliance (i.e., a "sanitizer") is illustrated in FIGS. 1-8 and designated broadly at 10. The appliance 10 includes a base 12, lower and upper cover sections 14, 16, a rack support 18 with an extendable rack 20, and a heating unit 22 (see FIG. 2). These components are described in greater detail below.

Figure 2:
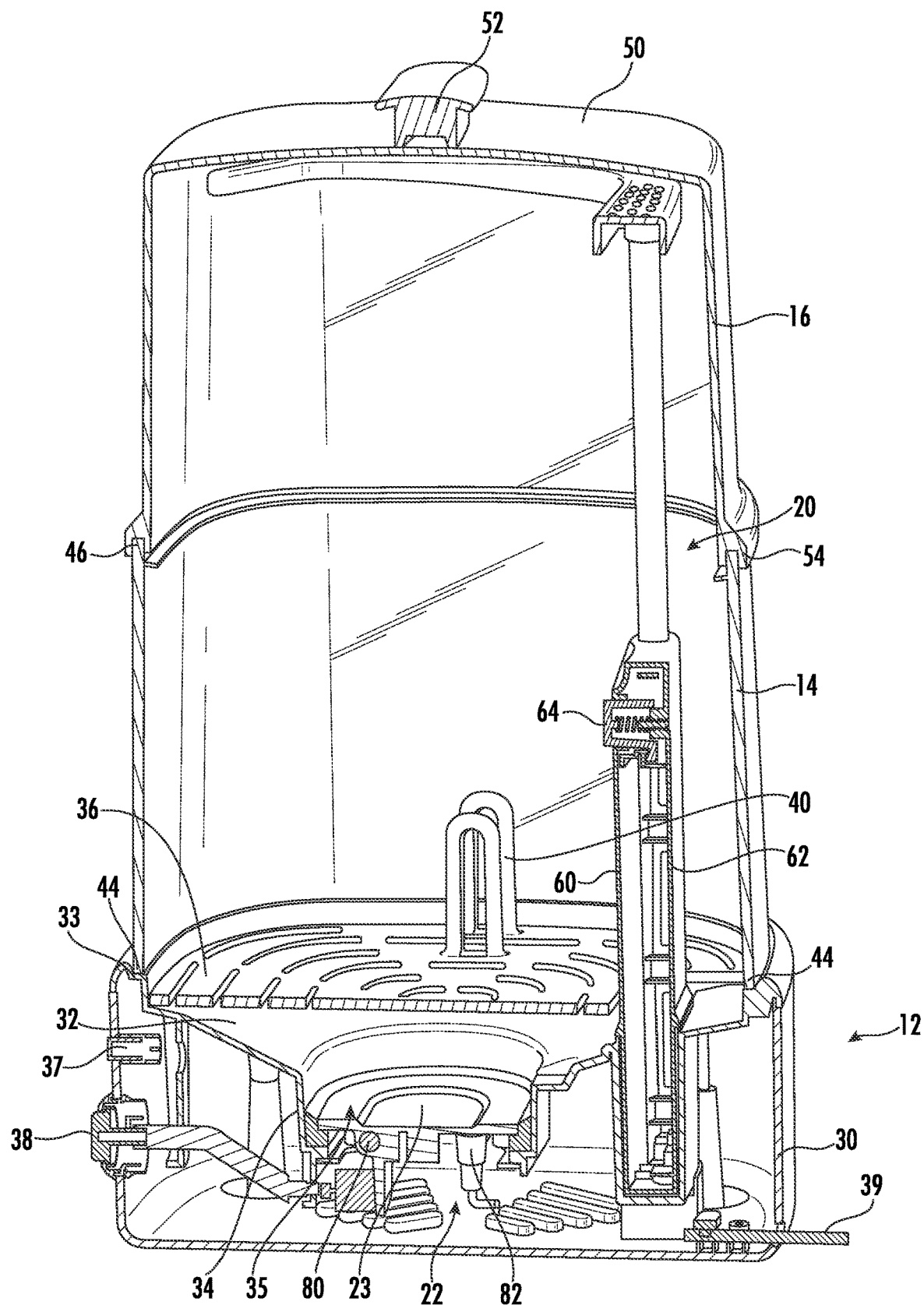
FIG. 2 is a front perspective section view of the sanitizing appliance of FIG. 1.

Referring to FIGS. 1 and 2, the base 12 has an outer housing 30, within which is housed the heating unit 22. A reservoir platform 32 overlies the outer housing 30 and has an upper lip 33. A basin wall 34 is recessed downwardly from the reservoir platform 32 and surrounds the heating unit 22. The basin wall 34 and the upper surface 23 of the heating unit 22 form a reservoir 35 that holds sanitizing liquid for the appliance. An activation button 38 is located in a side wall of the outer housing 30 and is operatively connected with the heating unit 22. A power cord 39 is operatively connected with the heating unit 22 and extends from the outer housing 30 opposite the activation button 38. Also, an indicator light 37 is mounted on the outer housing 30 above the activation button 38.

Typically, the outer housing 30 and the reservoir platform 32 are formed of a polymeric material, such as polypropylene. The material should have favorable properties in elevated temperatures and when exposed to water and other aqueous solutions.

A removable slotted tray 36 is positioned above the reservoir platform 32. The tray 36 includes a plurality of upwardly-extending guides 40 that can serve as supports and orientation features for items to be sanitized (e.g., sponges). The slotted tray 36 may also be formed of a polymeric material like polypropylene.

Referring again to FIGS. 1 and 2, the lower and upper cover sections 14, 16 are shown therein. The lower cover section 14 is generally a cube that is open at its top and bottom ends. A lower lip 44 is configured to mate with the upper lip 33 of the reservoir platform 32. The walls of the lower cover section 14 slope or cant slightly inward to an upper lip 46.

The upper cover section 16 is also generally a cube with slightly canted side walls, but it includes a ceiling 50 so that the upper cover section 16 has a closed upper end. A handle 52 extends upwardly from the ceiling 50. A lower lip 54 is present on the lower edge of the upper cover section 16 and may be sized similarly to that of the lower lip 44 of the lower cover section 14. As such, the lower lip 54 can mate with either the upper lip 46 of the of the lower cover section 14 (in the enlarged mode shown in FIGS. 1 and 2), or with the upper lip 33 of the reservoir platform 32 (in the compact mode shown in FIGS. 4 and 5). Thus, in the enlarged mode of FIGS. 1 and 2, the lower and upper cover sections 14, 16 together form an overall cover 15, whereas in the compact mode of FIG. 4 the upper cover section 16 alone forms the cover 15'. In each instance the cover 15, 15' and the reservoir platform 32 define a respective sanitation chamber 17, 17'.

The lower and upper cover sections 14, 16 may be formed of a polymeric material, such as polypropylene. In some instances, the lower and upper cover sections 14, 16 may be formed of a transparent material to allow for observation when the appliance 10 is in use.

Referring now to FIGS. 2, 3 and 6-8, the rack support 18 is generally rectangular and extends upwardly from the reservoir platform 32 from a location near the upper lip 33. The rack support 18 includes front and rear halves 60, 62 that enclose the lower portion of the rack 20. A spring-loaded release button 64 is located near the upper end of the front half 60.

Figure 6:
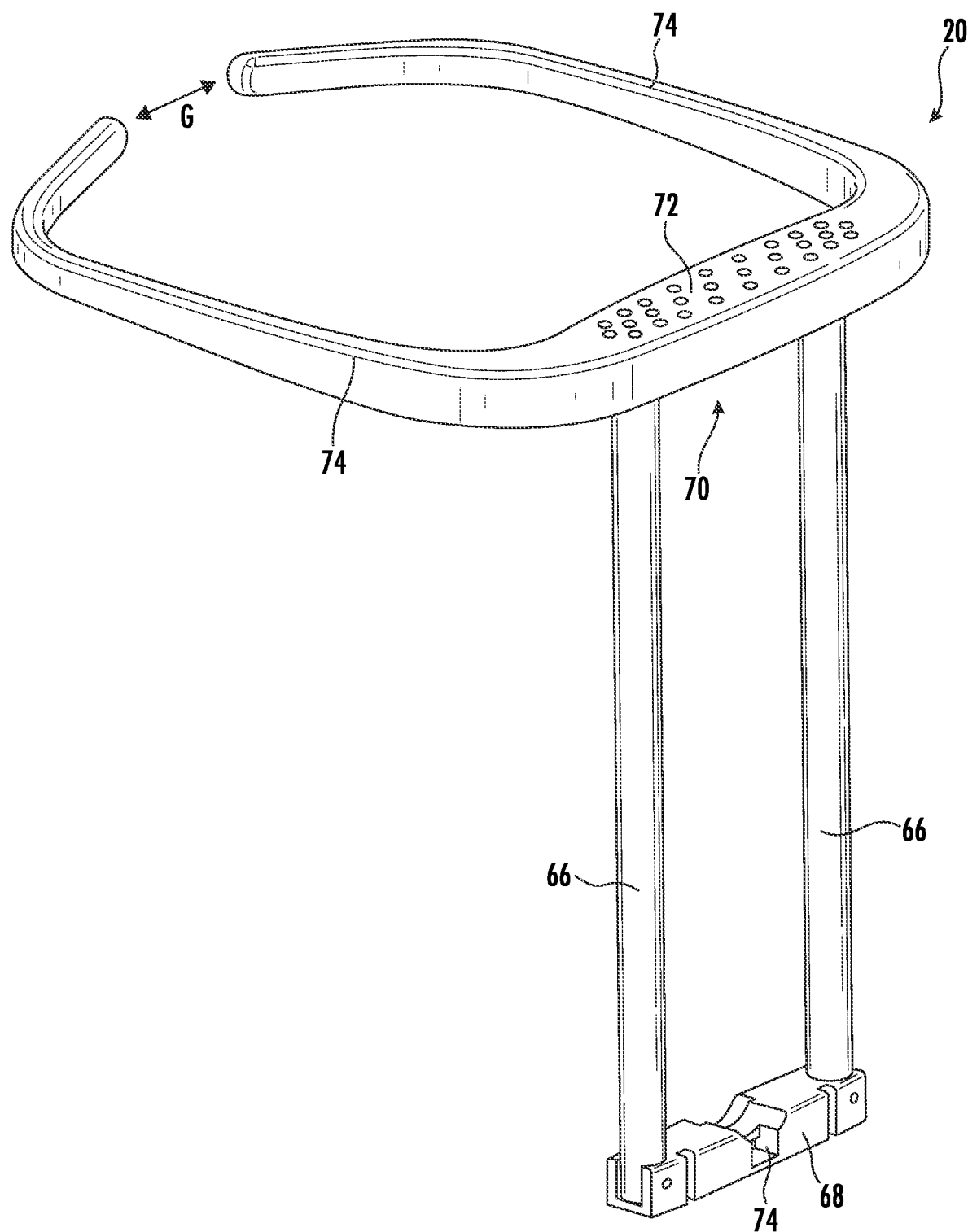
FIG. 6 is a perspective view of the rack of the sanitizing appliance of FIG. 1.

As can be seen in FIG. 6, the rack 20 includes two legs 66 that are spanned by a cross-member 68 at their lower ends. At their upper ends, the legs 66 terminate at a finger unit 70 with a cross-member 72 and two tines 74. The tines 74 extend forwardly from the cross-member 72, then angle inwardly, leaving a small gap G between their free ends.

Figure 7:
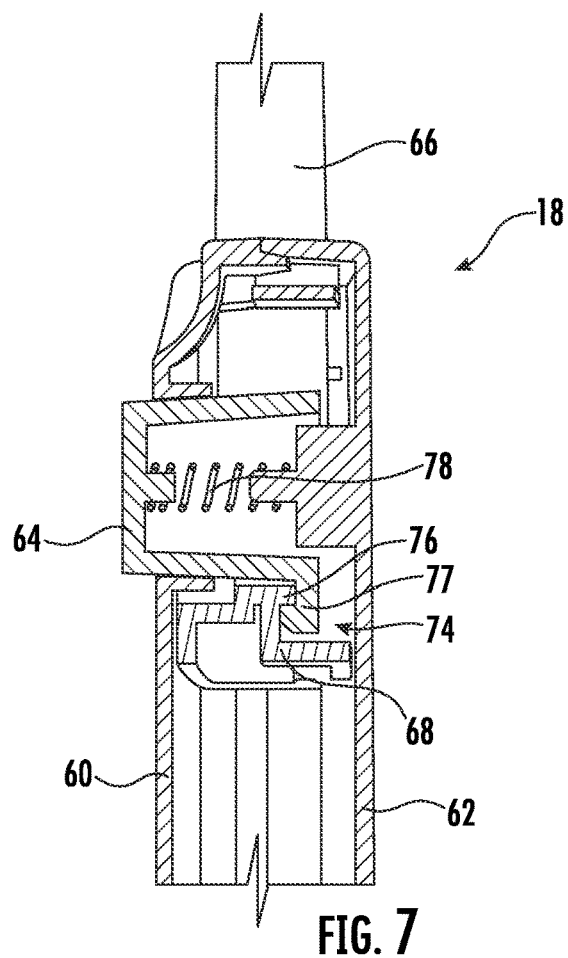
FIG. 7 is an enlarged partial side section view of the release button of the rack support and the cross-member of the rack of the sanitizing appliance of FIG. 1, with the rack in its raised position.
Figure 8:
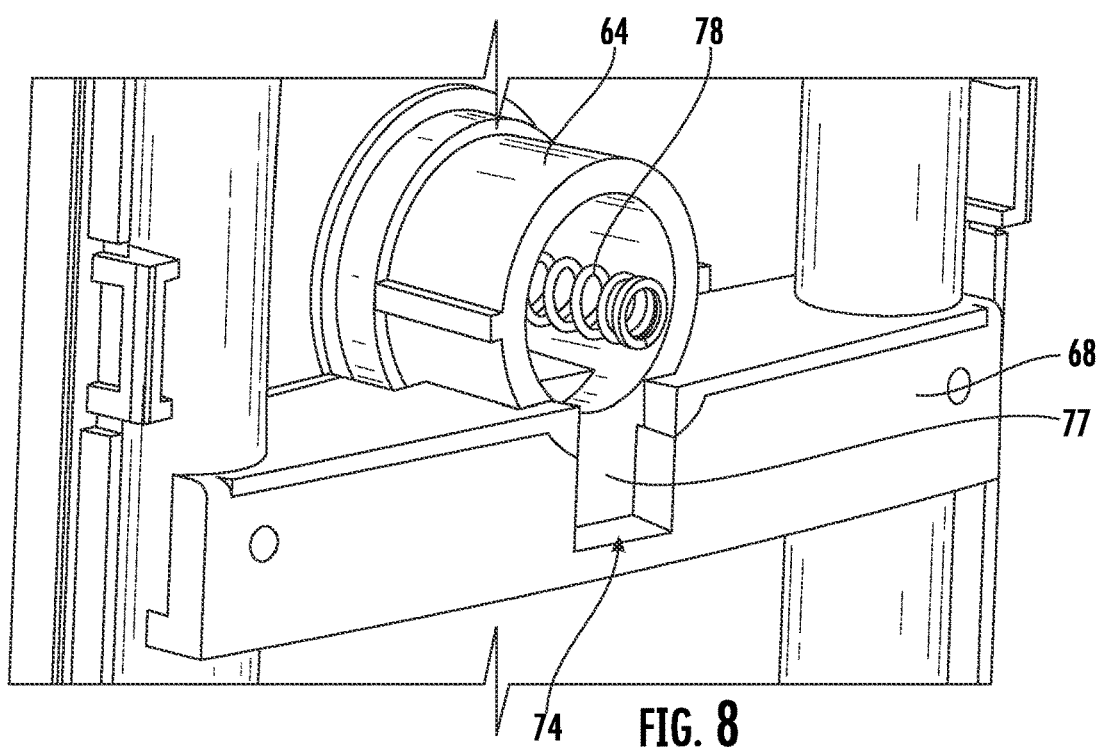
FIG. 8 is an enlarged partial rear perspective view of the release button and cross-member of FIG. 7.

As shown in FIGS. 6-8, the cross-member 68 has a central recess 74 with a small overhang 76. The release button 64 has a hook 77 that extends downwardly and forwardly from the lower surface of its rear end. A spring 78 is present within the release button 64. As can be seen in FIGS. 7 and 8, when the rack 20 is raised, it remains in the raised position by interaction between the overhang 76 and the hook 77, with the spring 78 biasing the release button 64 (and in turn the hook 77) forwardly to maintain the engagement of the hook 77 with the overhang 76. Depression of the release button 64 moves the hook 77 rearwardly to clear the overhang 76, at which point the cross-member 68 is free to descend to its lowered position.

The rack support 18 and rack 20 may be formed of a polymeric material, such as polypropylene.

The heating unit 22 (FIG. 2) includes a heating element 80 that underlies its upper surface 23. The heating element 22 is electrically connected with the power cord 39 and the activation button 38. In addition, the heating unit 22 includes a thermostat 82 that is connected with the heating element 22. The thermostat 82 is configured to disable the heating unit 22 when the temperature reaches a certain predetermined threshold (e.g., between 110° C. and 130° C., such as 120° C.); typically the threshold temperature is selected to indicate that the reservoir 35 no longer contains sanitizing liquid. Both the heating element 80 and the thermostat 82 may be of a conventional construction known to those of skill in this art.

To operate the appliance 10, the user removes the slotted tray 36 from the reservoir platform 32 to uncover the reservoir 35, fills the reservoir 35 with sanitizing liquid (e.g., 100 ml), and replaces the slotted tray 36. As used herein, the term "sanitizing liquid" is intended to include water (pure, treated, or including sanitizing chemicals) and other liquids which may be suitable for vapor sanitizing. The user may select either the enlarged mode (in which the lower cover 14 rests on the base 12, and the upper cover 16 rests on the lower cover-see FIGS. 1-3) or the compact mode (in which the upper cover 16 rests on the base 12 and the lower cover 14 is not used-see FIGS. 4 and 5).

If the compact mode is used, the rack 20 is in its lowered position, such that the cross-beam 68 is near the lower end of the rack support 18. Items to be sanitized can be placed on the slotted tray 36 (for example, sponges may be positioned between or leaning against the guides 40) and/or on the rack 20 (for example, dishrags or dishtowels may be draped over the tines 74). The upper cover 16 is positioned on the base 12 to form the sanitizing chamber 17'.

The user may then initiate sanitizing by pushing the activation button 38. This action provides power to the heating element 80 of the heating unit 22. As the temperature of the heating element 80 rises, the sanitizing liquid in the reservoir 35 begins to convert to steam and evaporate, thereby filling the sanitizing chamber 17' of the appliance 10 with steam. The steam immerses the items positioned in the appliance to sanitize them. Steam is generated until the thermostat 82 reaches its threshold temperature, which, as noted above, is typically selected to indicate that all of the sanitizing liquid in the reservoir 35 has been evaporated. At this point the thermostat 82 deactivates the heating element 80 (and in some instances also deactivates the indicator light 37), and the items can be removed from the appliance 10.

Figure 3:
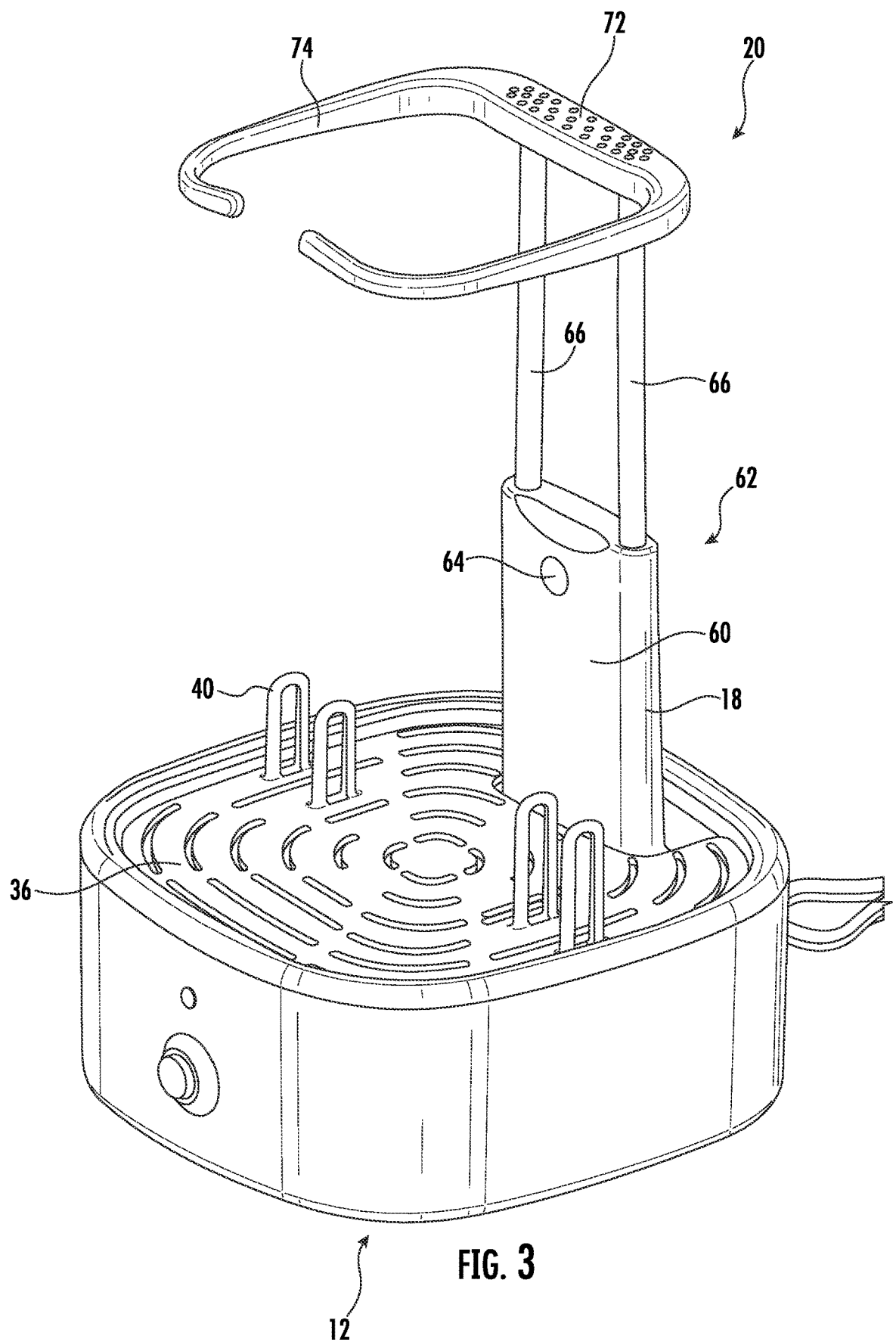
FIG. 3 is a front perspective view of the sanitizing appliance of FIG. 1, with the rack shown in its raised position.
Figure 4:
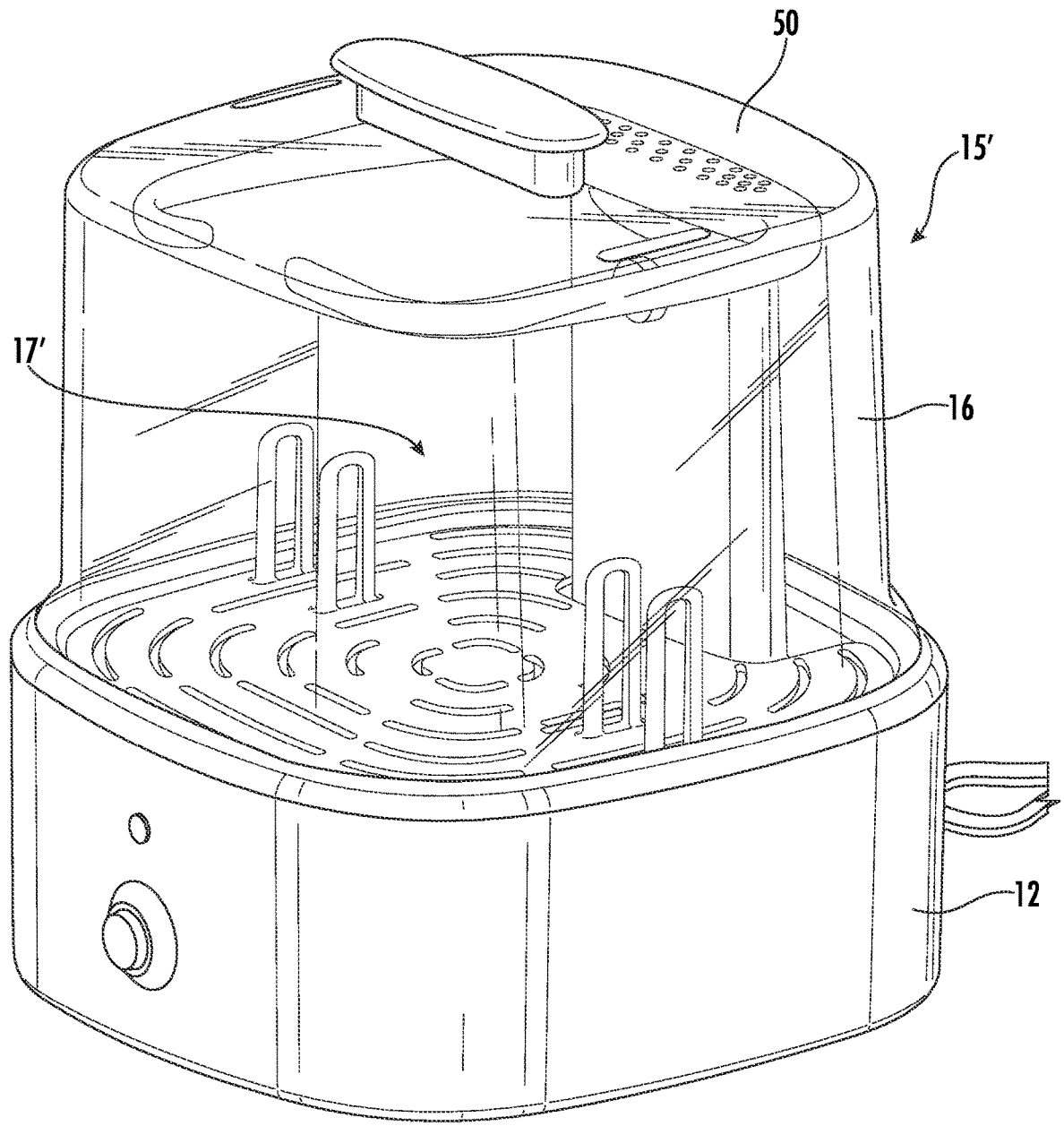
FIG. 4 is a front perspective view of the sanitizing appliance of FIG. 1, shown in its compact mode, with the rack in the lowered position.
Figure 5:
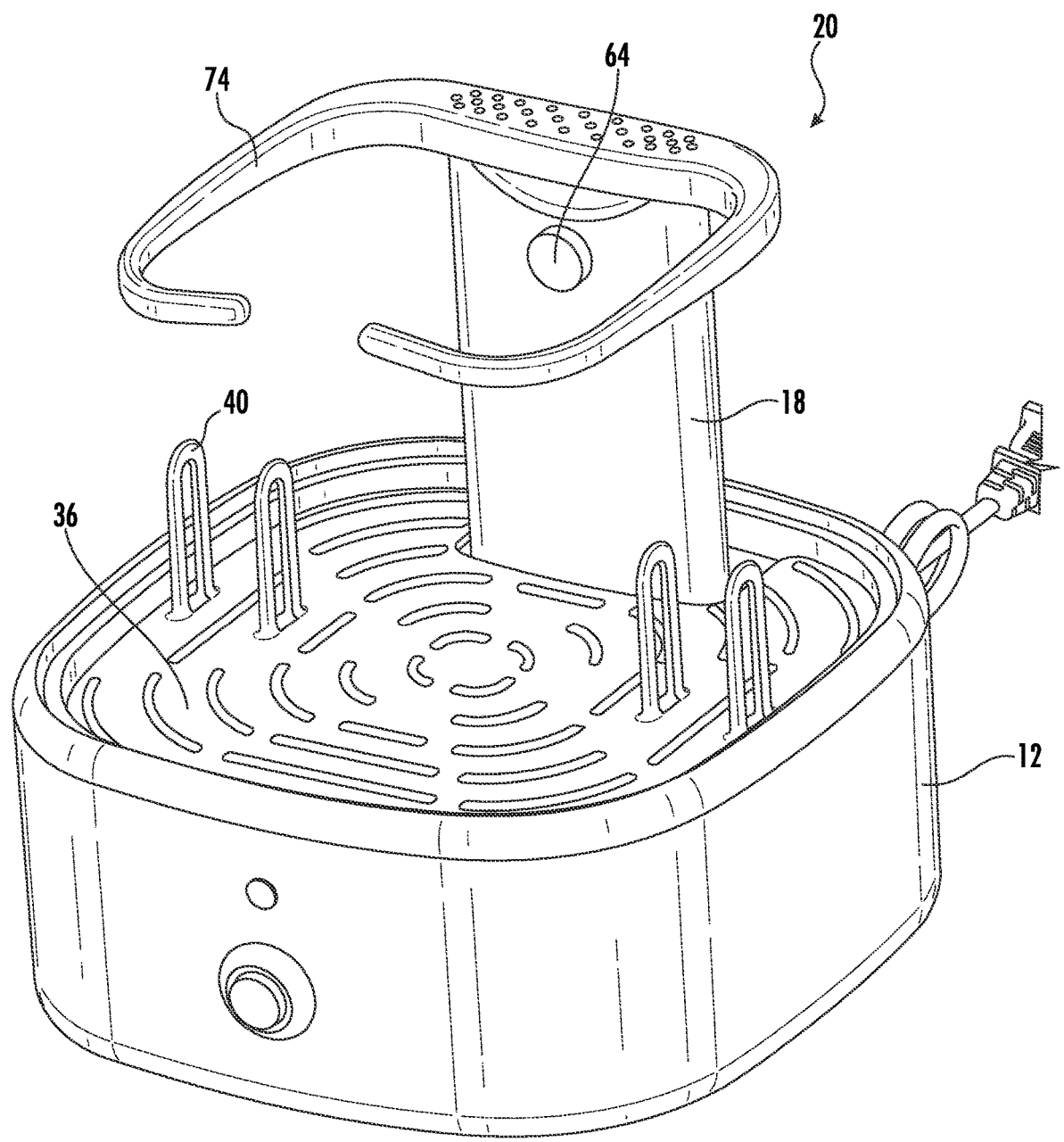
FIG. 5 is a front perspective view of the sanitizing appliance as in FIG. 4, with the rack in its lowered position.

If the user wishes to use the appliance in its enlarged mode, the user has the option of raising the rack 20 to its raised position (FIGS. 1-3). This is achieved by sliding the rack 20 upwardly relative to the rack support 18. When the cross-member 68 reaches the release button 64, the overhang 76 on the cross-member engages the hook 77 on the release button 64, which forces the release button 64 forwardly. As the cross-member 68 continues to rise, the overhang 76 ascends past the hook 77, which then is forced rearwardly by the spring 78 to underlie, and therefore capture, the overhang 76 (see FIGS. 7 and 8). As such, the rack 20 remains in the raised position.

Items to be sanitized can then be positioned on the slotted tray 36 and/or the rack 20 as described above. The lower cover 14 is placed on the base 12, and the upper cover 16 is placed on the lower cover 14, thereby forming the sanitizing chamber 17. Sanitizing can then be carried out in the manner described above for the compact mode.

When sanitizing is complete, the rack 20 can be lowered to is lowered position by depressing the release button 64. This action forces the hook 77 rearwardly to "clear" the hook 77, which allows the overhang 76 to descend past the hook 77. Once the overhang 76 clears the hook 77, the rack 20 can be lowered to its lowered position.

Those of skill in this art will appreciate that the appliance 10 may take other forms. For example, although the lower and upper cover sections 14, 16 are shown as bring separable, with the lower cover section 14 being removed for use in the compact mode, in some embodiments the upper and lower cover sections 14, 16 may be formed in a telescoping fashion, with the lower cover section 14 remaining in place and the upper cover section 16 nesting inside of the lower cover section 14 when the appliance 10 is in the compact mode. In addition, more than two cover sections may be employed, and in turn the rack 20 may be capable of residing at one or more intermediate positions in addition to the raised and lowered positions described herein.

The rack 20 may also take other configurations. For example, although two tines 74 are shown, more or fewer tines may be included. Further, in some instances the individual tines 74 may have branches to provide more locations for hanging items. The manner and/or structure for maintaining the rack 20 in the lowered or raised position may vary. The rack support 18 may be integrated with the reservoir platform 32, or may comprise a separate piece (which may facilitate shipping and/or storage of the appliance 10). Other variations are also possible.

Figure 9A:
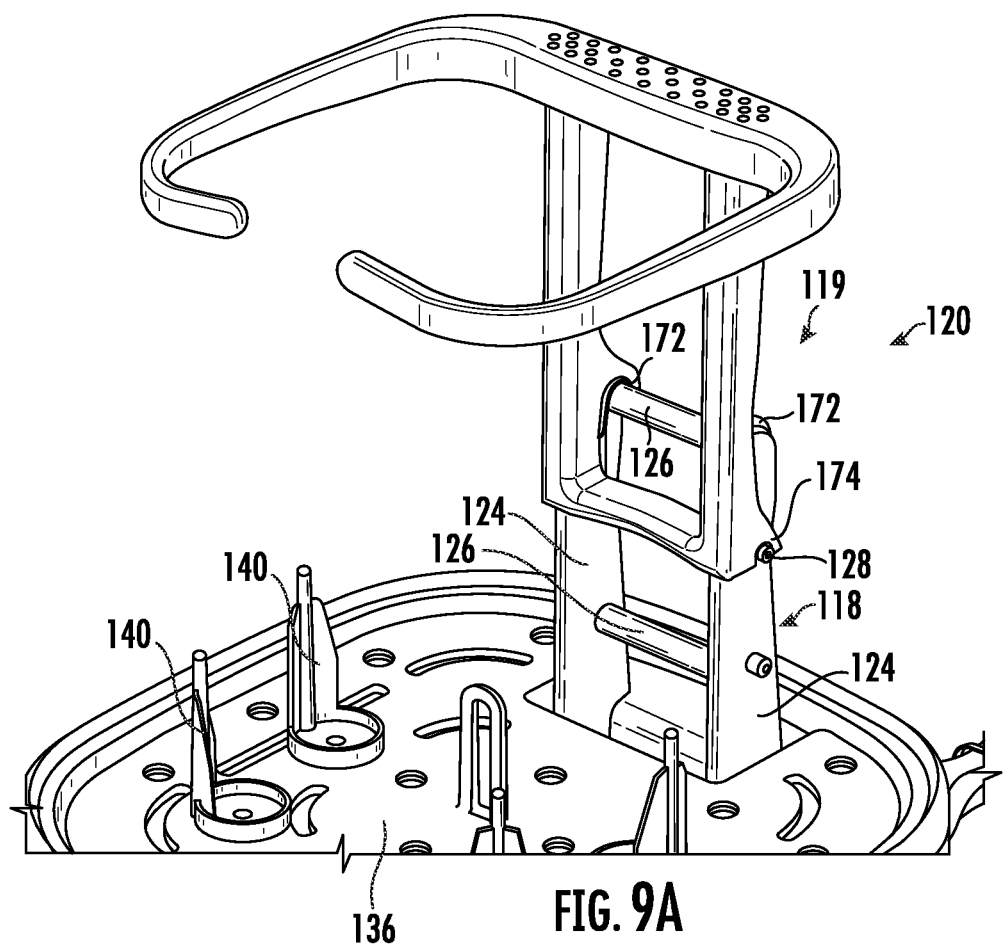
FIG. 9A is a partial perspective view of a sanitizing appliance according to alternative embodiments of the invention, with the cover sections removed and the rack shown in a raised position.
Figure 9B:
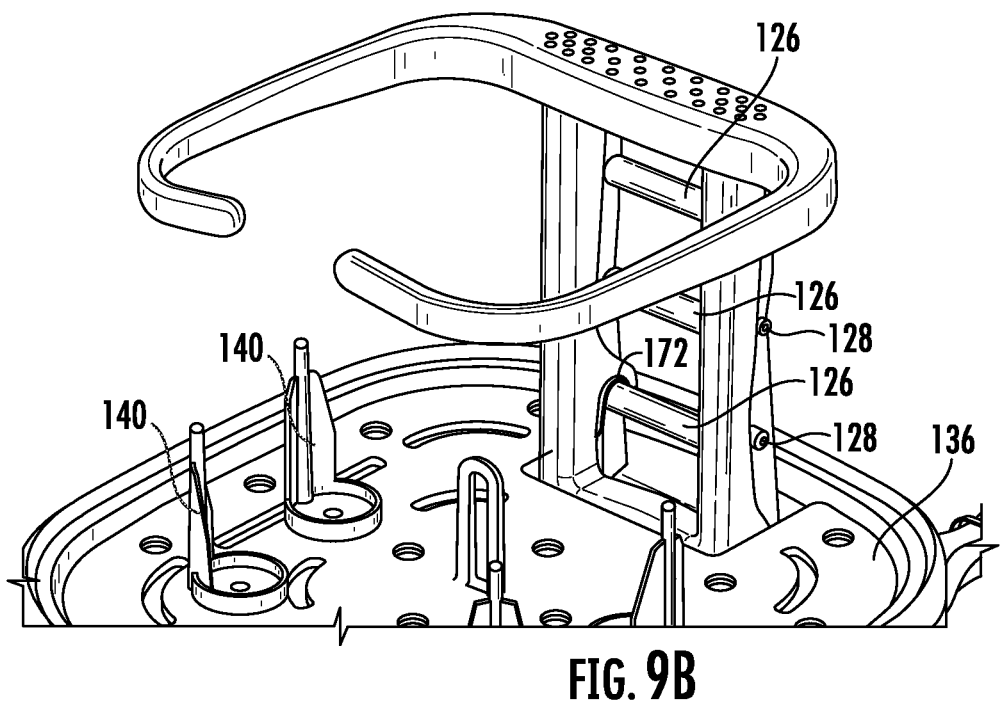
FIG. 9B is a partial perspective view of the sanitizing appliance of FGIG. 9A, with the rack in a lowered position.
Figure 10:
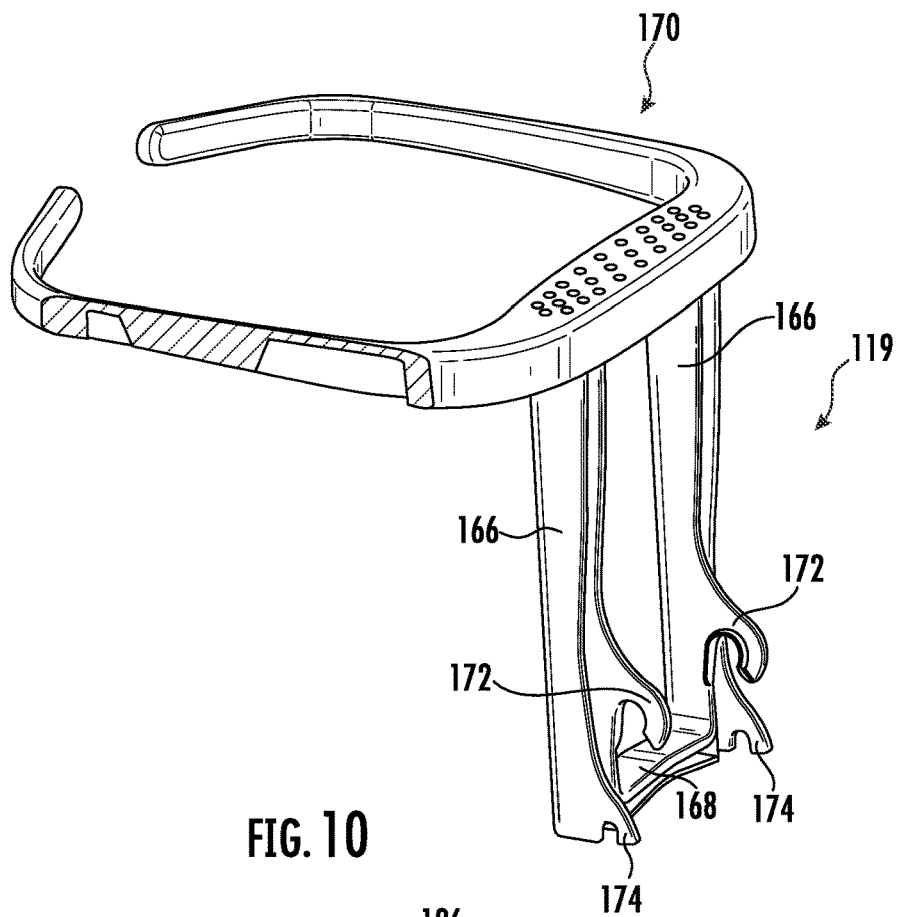
FIG. 10 is a perspective view of the upper member of the rack of the sanitizing appliance of FIG. 9A.
Figure 11:
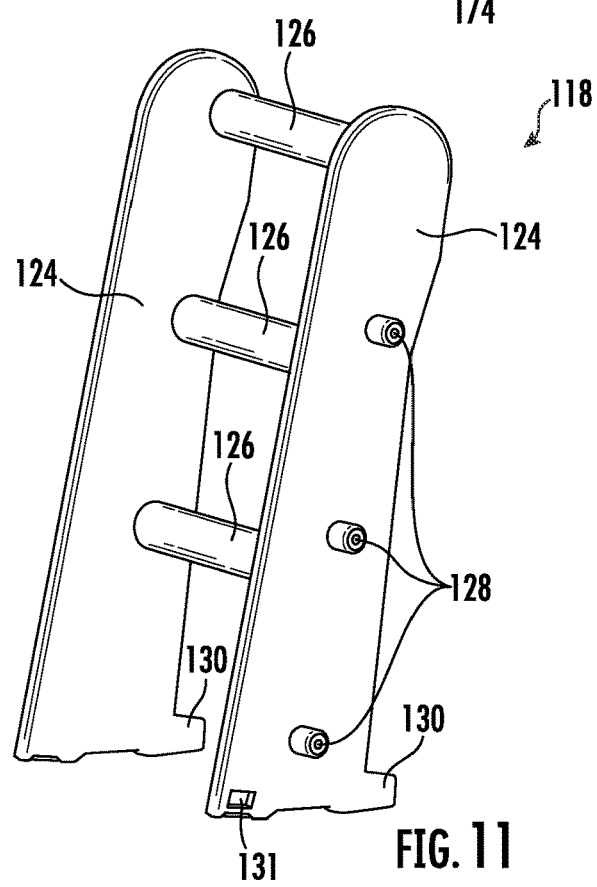
FIG. 11 is a perspective view of the lower member of the rack of the sanitizing appliance of FIG. 9A.

An example of a different configuration for the rack is shown in FIGS. 9A-12 and is designated broadly at 120. The rack 120 includes a support 118 and an upper member 119. As shown in FIG. 11, the support 118 has elongate side walls 124 that are spanned by three rungs 126. Three posts 128 extend outwardly from each side wall 124. At its lower end, the support 118 has two feet 130 that extend generally horizontally. A small slot 131 is present near the lower edge of each side all 124.

Figure 12:
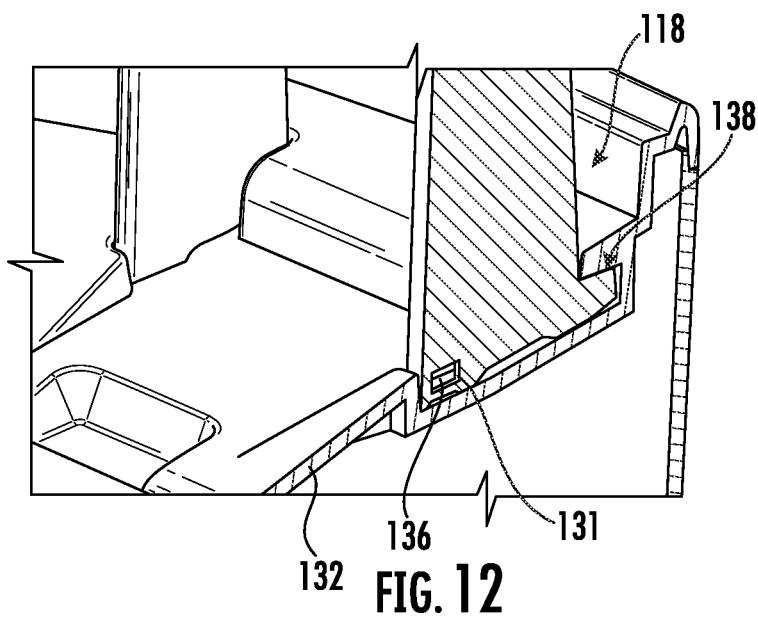
FIG. 12 is an enlarged partial perspective view of the lower member mounted within the base.
Figure 13:
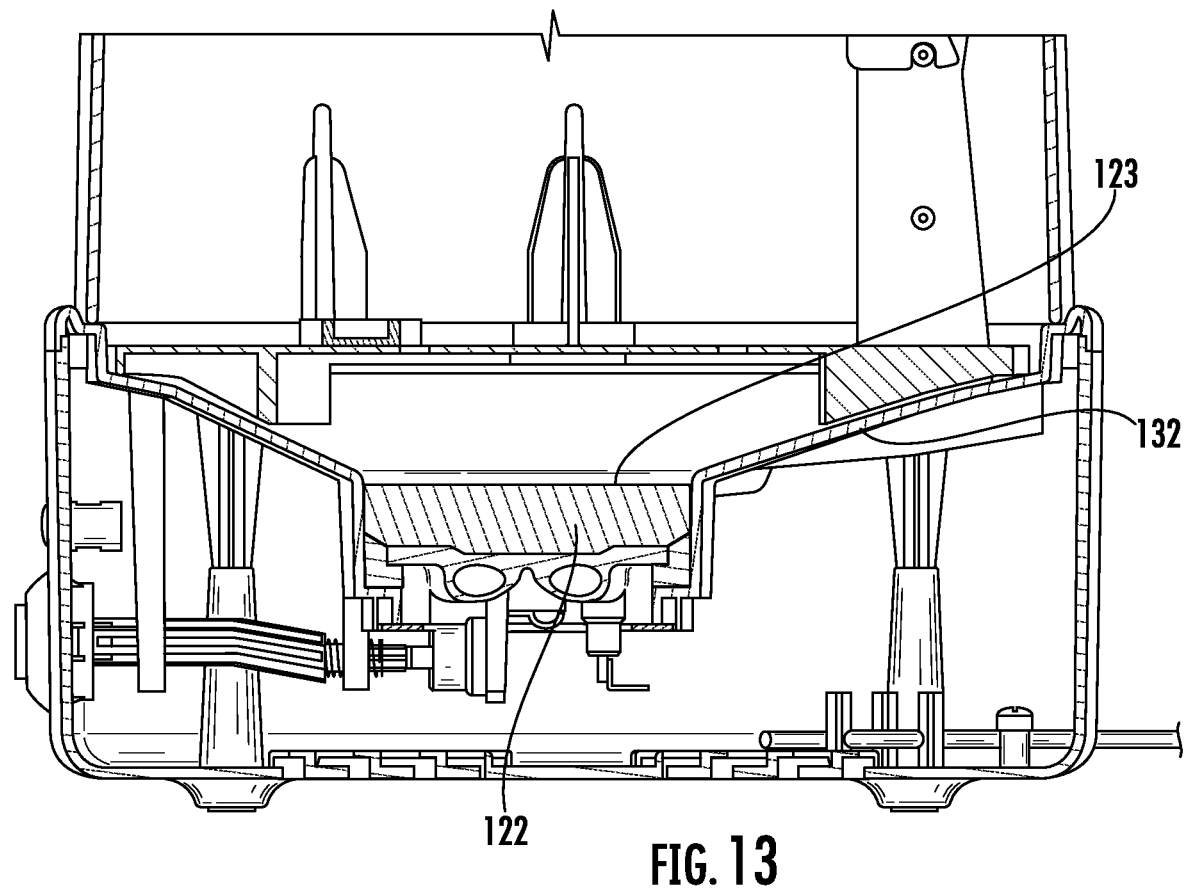
FIG. 13 is a partial section view of the sanitizing appliance of FIG. 9A showing the reservoir platform and the heating unit.

As shown in FIG. 12, the support 118 is mounted to the reservoir platform 132, which includes a groove 134 with a nub 136 near one end. The nub 136 is received in the slot 131 of the support 118. The feet 130 are received in small pockets 138 located at the opposite end of each groove 134. Thus, it can be imagined that the support 118 can be mounted to the reservoir platform 132 by inserting each foot 130 into a respective groove 134, then sliding the feet toward the pockets 138 while pivoting the support 118 so that the slots 131 reach and capture the nubs 136.

Referring now to FIG. 10, the upper member 119 has a finger unit 170 similar to that of the rack 20. The finger unit 170 is supported by two arms 166 that are spanned by a cross-member 168. A large clip 172 extends rearwardly from each arm 166 above the cross-member 168. A smaller clip 174 extends rearwardly from the cross-member 168 at approximately the elevation of the cross-member 168.

As can be understood by examination of FIGS. 9A and 9B, the upper member 119 can be mounted on the support 118 by hooking the large clips 172 over one of the rungs 126, then hooking the small clips 174 over the posts 128 that are immediately below that rung 126. The clipping action secures the upper member 119 onto the support 118. The finger unit 170 can be positioned at three different heights: A raised position, utilizing the uppermost rung 126 and posts 128, as shown in FIG. 9A, a lowered position utilizing the lowermost rung 126 and posts 128, as shown in FIG. 9B, and an intermediate position utilizing the middle rung 126 and posts 128 (not shown).

Also, although in the illustrated embodiment the tray 36 includes guides 40 for supporting a variety of different items to be sanitized, in other embodiments the tray 36 may lack the guides, or may have guides or other projections or features that are designed to support and/or orient specific items to facilitate their sanitizing. Alternatively, the guides may be separate components that are inserted into the tray (see FIG. 9A, which shows guides 140 in tray 135).

As another option, the rack 20 may have integral features that may support or present certain items in a desired manner.

Further, the heating unit 22 and the power circuit that drives it may be configured differently. For example, the thermostat 82 may be omitted, and a timer or other device for determining when the heating element 80 should be deactivated may be employed instead. The indicator light 37 may be omitted or repositioned, as may the activation button 38. Also, the indicator light 37 may be configured to deactivate after sanitizing based on a temperature measured in the sanitizing chamber 17, 17' or on the duration elapsed after the heating unit 22 is deactivated. Also, as shown in the sanitizing appliance 120 of FIGS. 9A-13, the reservoir platform 132 may be configured so that it lacks a basin wall, with the result that the upper surface 123 of the heating unit 122 is flush with the lower edge of the reservoir platform 132. As a result, the reservoir platform 132 and the upper surface 123 of the heating unit 122 form the reservoir that receives water for subsequent steam generation.

The appliance 10 may be employed to sanitize any number of different types of items, but in particular may be used to sanitize reusable household cleaning items that may benefit from the sanitizing operation between uses. Exemplary reusable household cleaning items may include (but are not limited to) sponges, dishtowels, dishrags, hand towels, brushes, scrubbers, squeegees and the like. Such items may be difficult to clean satisfactorily by conventional methods, but can be thoroughly cleaned and sanitized via steaming.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. A sanitizing appliance, comprising:
   a base having a reservoir and a heating unit positioned to heat the reservoir;
   an extendable rack mounted to the base, the extendable rack moveable between raised and lowered positions; and
   a cover comprising lower and upper cover sections;
   wherein in a first enlarged mode, the lower cover section is interposed between the upper cover section and the base to form a first, larger sanitizing chamber, and in a second compact mode, the upper cover section and the base form a second, smaller sanitizing chamber.

2. The sanitizing appliance defined in claim 1, wherein the extendable rack includes at least one generally horizontally-disposed tine.

3. The sanitizing appliance defined in claim 1, wherein the first enlarged mode, an uppermost portion of the extendable rack is adjacent the upper cover section, and the second compact mode, the uppermost portion of the extendable rack is adjacent the upper cover section.

4. The sanitizing appliance defined in claim 1, wherein the extendable rack is mounted to the base via a rack support.

5. The sanitizing appliance defined in claim 4, wherein the extendable rack and the rack support include features that releasably maintain the extendable rack in the raised position.

6. The sanitizing appliance defined in claim 1, further comprising a temperature threshold device configured to deactivate the heating unit when a threshold temperature is reached.

7. The sanitizing appliance defined in claim 1, further comprising a perforated tray that overlies the reservoir.

8. The sanitizing appliance defined in claim 7, wherein the perforated tray includes upwardly-projecting guides.

9. A sanitizing appliance, comprising:
   a base having a reservoir and a heating unit positioned to heat the reservoir;
   an extendable rack mounted to the base, the extendable rack moveable between raised and lowered positions; and
   a cover comprising lower and upper cover sections;
   wherein in a first enlarged mode, the lower cover section is interposed between the upper cover section and the base to form a first, larger sanitizing chamber, and in a second compact mode, the lower cover section is removed, and the upper cover section and the base form a second, smaller sanitizing chamber.

10. The sanitizing appliance defined in claim 9, wherein the first enlarged mode, an uppermost portion of the extendable rack is adjacent the upper cover section, and the second compact mode, the uppermost portion of the extendable rack is adjacent the upper cover section.

11. The sanitizing appliance defined in claim 9, wherein the extendable rack is mounted to the base via a rack support, and wherein and the rack support include features that releasably maintain the extendable rack in the raised position.

12. The sanitizing appliance defined in claim 9, further comprising a temperature threshold device configured to deactivate the heating unit when a threshold temperature is reached.

* * * * *